United States Patent

[11] 3,616,880

| [72] | Inventor | Ronald L. Shellhause<br>Vandalia, Ohio |
|---|---|---|
| [21] | Appl. No. | 30,120 |
| [22] | Filed | Apr. 20, 1970 |
| [45] | Patented | Nov. 2, 1971 |
| [73] | Assignee | General Motors Corporation<br>Detroit, Mich. |

[54] FLOATING ANCHOR-CYLINDER DRUM BRAKE WITH ADJUSTER
4 Claims, 6 Drawing Figs.

[52] U.S. Cl. .................................................. 188/79.5 GC,
188/206 R, 188/364, 188/250 C
[51] Int. Cl. ............................................... F16d 51/52,
F16d 51/24
[50] Field of Search ........................................ 188/79.5 P,
79.5 GC, 331, 335, 342, 364, 206 A, 206 R, 250 C

[56] References Cited
UNITED STATES PATENTS
| 1,953,258 | 4/1934 | Pentz............................... | 188/364 |
|---|---|---|---|
| 2,152,066 | 3/1939 | La Brie........................... | 188/364 |
| 2,833,378 | 5/1958 | Main............................... | 188/364 X |
| 3,314,507 | 4/1967 | Tantlinger et al.............. | 188/206 A X |
| 3,378,113 | 4/1968 | Hanley et al.................... | 188/364 X |

*Primary Examiner*—Duane A. Reger
*Attorneys*—F. J. Soucek and C. R. Engle

ABSTRACT: A vehicle drum brake assembly including stamped sheet metal brakeshoes comprising double web members straddling a backing plate and guided thereon during application of the brakes. The backing plate comprises a notch receiving a tubular wheel cylinder assembly including slotted ends which are loosely fitted upon the backing plate for limited movement in the notched-out area. Engagement of the primary brakeshoe results in a torque reaction passing from the primary shoe to the secondary shoe and thence to the wheel cylinder assembly displacing the same to positively engage the slots with the backing plate and provide a positive anchor for the brakeshoes while the brakes are being applied. The relatively loose fit of the wheel cylinder within the notch of the backing plate accommodates thermal expansion and any variations in distortion of the drum so that the brakes are uniformly applied during all operative conditions.

PATENTED NOV 2 1971 3,616,880

INVENTOR
Ronald L. Shellhause

BY

C.L. Engle

ATTORNEY

INVENTOR.
Ronald L. Shellhause
BY
C. R. Ingle
ATTORNEY

FLOATING ANCHOR-CYLINDER DRUM BRAKE WITH ADJUSTER

This invention relates to a vehicle drum brake assembly and more particularly to a drum brake assembly including a backing plate slidably mounting stamped sheet metal brakeshoe assemblies having central double web structures defining a notch receiving the backing plate.

In the vehicle brake art thermal expansion of various components has in the past created certain operational difficulties. Among these difficulties are the warping and consequent binding of relatively movable components and a lack of full face contact of the shoes with the drum. The effects of thermal distortion and misalignment of components are greatly reduced by this invention through utilization of a backing plate slidably supporting a pair of stamped sheet metal brakeshoes having double webs straddling its periphery. The backing plate contains a notch loosely receiving slotted ends of a floating wheel cylinder which receives reactive torque and is locked in the notch to anchor the assembly when the brakes are engaged. By providing the floating anchor arrangement in combination with shoes guided upon the Lbacking plate more uniform brakeshoe engagement with an out-of-round drum results and brake roughness is reduced due to the freedom of movement of the shoes with the floating cylinder assembly until the drum surface is engaged. The ability of the cylinder assembly to act as a floating anchor also eliminates objectionable brake wrap-up frequently occurring in currently used systems when the secondary shoe shifts in response to reactive torque. Torque modulation is also improved by this invention since thermal distortions have little or no effect on the system. A force on the brake pedal provides a braking output force that is more constant and commensurate with the pedal force.

Accordingly among the objects of this invention is the provision of a floating anchor cylinder assembly which is loosely mounted in a backing plate and is canted into anchored engagement with the plate during application of the brakes.

Another object of this invention is the provision of a drum brake assembly including double-webbed shoes that are guided upon a backing plate during expansion and contraction of the shoes so that the brake lining surface Lis uniformly engaged with the brakedrum.

A further object of this invention is the provision of a floating anchor cylinder drum brake assembly including components freely assembled together permitting compensation for discrepancies in alignment and thermal expansion during operation of the brakes.

Another object of this invention is the provision of a floating anchor cylinder drum brake assembly arranged to provide more room for wheel cylinders without increasing the size of the brake assembly.

Another object of this invention is the provision of a floating anchor cylinder drum brake assembly allowing use of larger wheel bearings in that more area is available in the central portion of the brake assembly. L A still further object of the present invention includes the provision of a wheel cylinder assembly including a cylinder having slots formed in each end thereof that are loosely fitted within a notch in a backing plate for both radial and circumferential limited movement to accommodate irregularities in shape and thermal distortion of various components in the system during operation thereof and to lock up the system and anchor the primary and secondary shoes at a predetermined point for positive application and engagement with the brakedrum providing a uniform braking effect.

Figure 1:
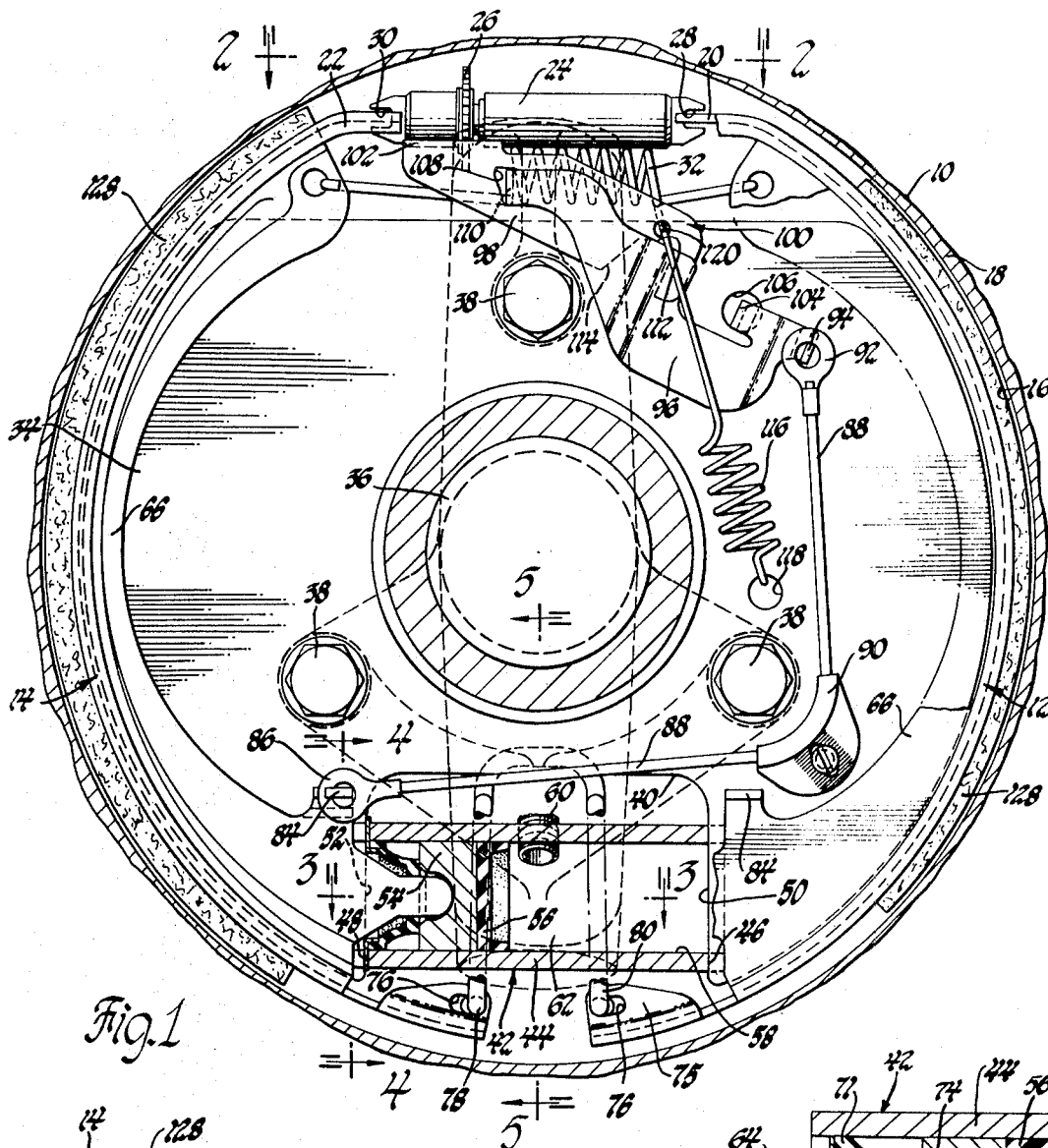
FIG. 1 is a side elevational view partly in section illustrating the vehicle brake assembly of this invention located within a wheel drum.
Figure 2:
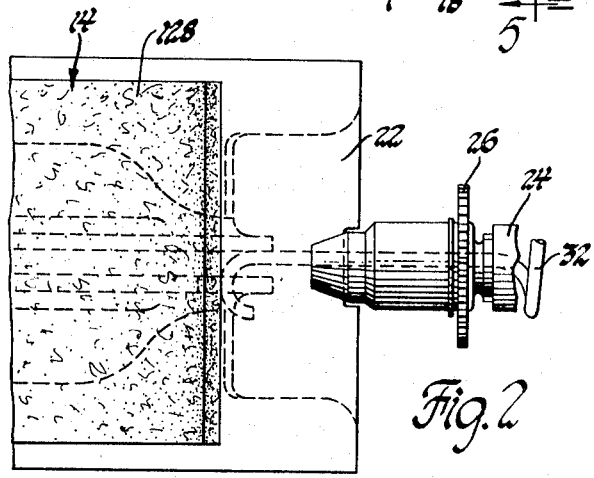
FIG. 2 is a fragmentary sectional view taken on lines 2—2 of FIG. 1 illustrating the relationship between the automatic adjuster and one of the brakeshoe assemblies.

With reference to FIG. 1, a drum brake assembly 10 includes a primary brakeshoe assembly 12 operatively associated with a secondary brakeshoe assembly 14 for actuation toward and away from the interior surface 16 of brakedrum 18. The upper ends 20 and 22 of the primary and secondary shoe assemblies 12 and 14 are formed to engage and support an automatic lining-wear-compensating adjuster assembly 24 including a star wheel 26. The ends 20 and 22 of the primary and secondary shoe assemblies are drawn into engagement with slots 28 and 30 formed in the ends of the automatic adjuster 24 by a coil spring 32 secured to each of the shoe assemblies.

A backing or support plate 34 is secured to a fixed portion of the vehicle suspension system adjacent a wheel axle 36 by means of a plurality of bolts 38 best illustrated in FIG. 1. The backing plate 38 contains a relatively large notched recess 40, best shown in FIG. 6, which is formed to receive a tubular wheel cylinder assembly 42. The tubular wheel cylinder assembly includes a cylindrical housing member 44 containing notches 46 and 48 in each end thereof which are formed to loosely fit upon edges 50 and 52 of the notched recess 40 in backing plate 34, as also shown in FIG. 6.

Figure 3:
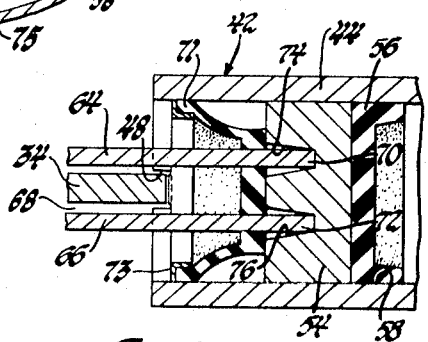
FIG. 3 is a fragmentary sectional view taken on lines 3—3 of FIG. 1 illustrating the relationship of one of the brakeshoe assemblies with an actuating piston mounted within the wheel cylinder assembly.

As best illustrated in FIG. 1 and 3, the wheel cylinder assembly 42 includes a pair of pistons 54, only one of which is shown, including a cup seal 56 resiliently biased against the inner surface 58 of the cylinder housing 44 providing a fluid-tight seal therebetween. The wheel cylinder housing 44 has a conduit 60 threadably attached to its central portion to selectively direct pressure fluid from a master cylinder to space 62 intermediate the pistons 54.

Figure 4:
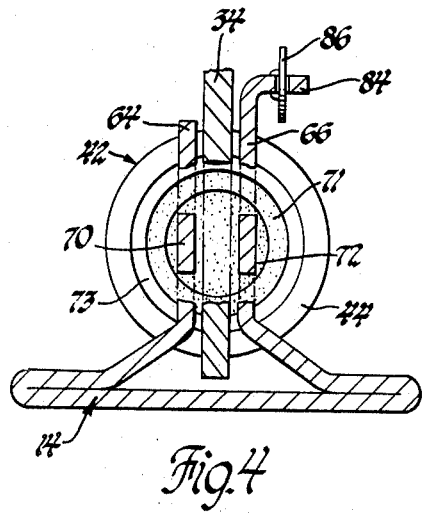
FIG. 4 is a cross-sectional view taken on lines 4—4 of FIG. 1 showing a stamped sheet metal shoe having its webs straddling a backing plate.
Figure 5:
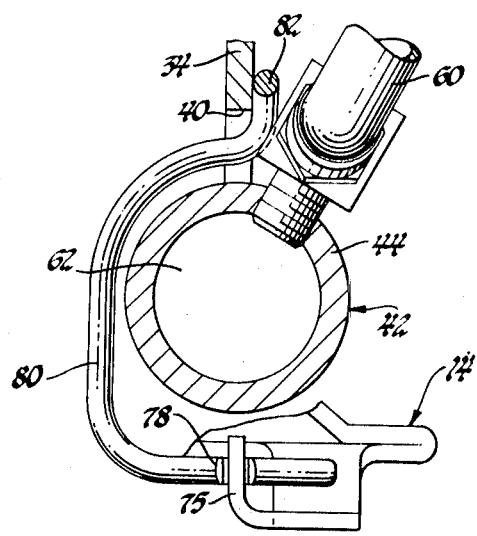
FIG. 5 is a sectional view taken on lines 5—5 of FIG. 1 illustrating the disposition of a biasing spring located to return the shoes to a retracted position when the brakes are no longer being applied.
Figure 6:
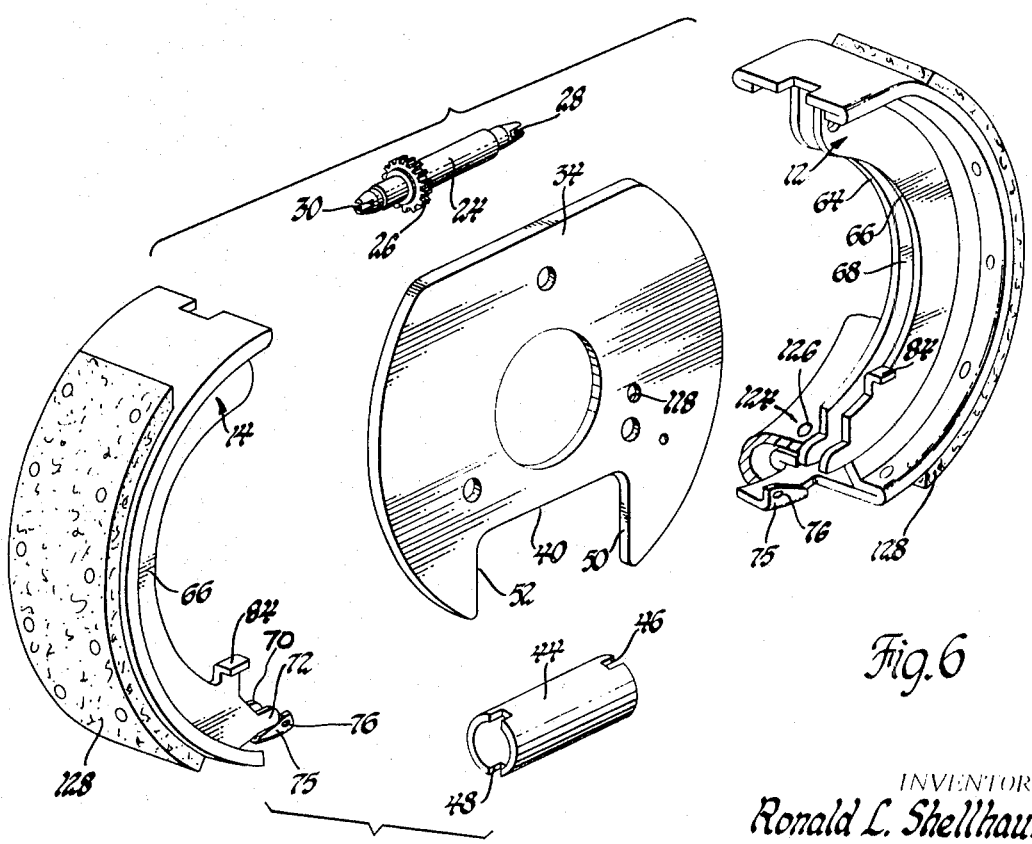
FIG. 6 is an exploded pictorial view illustrating the relationship of the brakeshoes relative to the backing plate in conjunction with the automatic adjusting mechanism and the wheel cylinder assembly.

With particular reference now to FIGS. 3, 4 and 6, the primary and secondary shoe assemblies 12 and 14 are formed from stamped metal to include double webs 64 and 66 thereby defining a slot 68 slidably receiving a portion of backing plate 34. The webs 64 and 66 terminate at their lower ends in projections 70 and 72 which extend within tubular wheel cylinder assembly 42 and respectively engage slots 74 and 76 formed in each of the pistons 54. A boot seal 71 preventing the entrance of foreign matter in each end of cylinder housing 44 is secured in place by a clip 73. Each of the Lshoe assemblies include a circumferentially extending member 75 extending underneath the tubular wheel cylinder assembly 42, each containing a slot 76 receiving a bent end 78 of a U-shaped wire spring 80 that has an upper looped end 82 wedged behind backing plate 34 above notch 40 whereby the respective bent portions 78 in the slots 76 continually bias the lower ends of the shoe assemblies 12 and 14 inwardly to a retracted position.

The primary and secondary brakeshoe assemblies 12 and 14 comprise near their lower ends a laterally extending flange 84 in the assembly of FIG. 1, the flange 84 of secondary shoe assembly 14 receiving end 86 of a cable 88 that passes through a guide member 90 conventionally secured to the support or backing plate 34. The cable 88 terminates in a second eye member 92 secured to a laterally extending flange 94 of a first lever 96 which in conjunction with a second lever 98 comprises a composite lever actuator assembly 100 operable to engage star wheel 26 of the automatic adjusting device 24 via a laterally extending flange 102.

The first lever 96 comprises an integral laterally extending pivot member 104 extending into an aperture 106 in backing plate 34 providing a pivot point for the lever 96 when actuated by cable 88. The second lever 98 includes a slot 108 receiving a bent tab 110 of lever 96 for a purpose later described. Also the first lever 96 includes a laterally extending shoulder 112 received in slot 114 of lever 98, the slot 114 being biased into engagement with the shoulder 112 by coil spring 116 secured in aperture 118 in backing plate 34 and engaging aperture 120 in lever 98 adjacent the slot 114.

The purpose of composite lever 100 is to compensate for the possibility of star wheel 26 of the automatic adjuster being frozen and unresponsive to movement by the lever flange 102 when the cable 88 is actuated by engagement of the brakes. Should this situation arise, the first lever 96 pivots about member 104, the bent tab 110 simultaneously moves in slot 108 of the second lever 98, and the lever 98 pivots notch 114 away from the shoulder 112 against spring 116 whereby the movement is absorbed without creating an interference and possible fracture in the composite lever arrangement.

The brakeshoe assemblies 12 and 14 can have arcuate splash shields 124 attached by rivets 126 which also secure lining material 128, see FIG. 6. The splash shield 124 can be of various forms but is required to extend sufficiently to cover the drum 18 without engaging it when the shoes are retracted.

During energization of the brakes, the primary shoe assembly 12 is actuated into engagement with the inner surface 16 of drum 18 in response to pressure fluid supplied through conduit 60 to the space 62 intermediate Lthe brake apply pistons 54. As the shoe engages drum surface 16 it tends to rotate counterclockwise with the drum and the torque resulting from such engagement is transmitted through the automatic adjuster to the secondary shoe 14 which is also being expanded into engagement with the inner surface of the drum by one of the pistons 54 in contact with projections 70 and 72. The secondary shoe assembly 14 also rotates a small amount in a counterclockwise direction causing the cylinder housing 44 to slightly tilt engaging and anchoring the slots 46 and 48 with their respective edges 50 and 52 of recess 40 in the backing plate 34 thereby positively locking up the arrangement. The brakeshoes 12 and 14 remain anchored while the brakes are energized.

The recesses 74 and 76 in the pistons 54 are arcuately formed to Laccommodate the projections 70 and 72 of the respective brakeshoes so that this tilting effect or movement can take place without interfering with the expansive movement of the brakeshoe assemblies into engagement with the brakedrum 18. The slots 46 and 48 are of a sufficient width and depth compared to the thickness of the backing plate 34 and width of notch 40 allowing a slight amount of rotational movement as well as axial tilting of tubular cylinder housing 44 thereby compensating for machining tolerances and thermal distortions while positively locking up the arrangement during application of the brakes.

It is significant that the webs 64 and 66 define the slot 68 receiving a substantial circumferential portion of backing plate 34 to guide expansive and contractive movement of the respective shoe assemblies. With this arrangement a predetermined amount of clearance can be provided between the webs and the backing plate allowing for any warping or misalignment of the components in the assembly so that the shoes are evenly and positively applied against the inner surface 16 of the brakedrum. Further it is advantageous that the shoes and the floating wheel cylinder assembly accommodate a Lslight amount of circumferential movement within the brakedrum so that the shoes can shift and uniformly engage an out-of-round drum.

While a preferred embodiment of the invention has been described for purposes of illustration only, it is apparent that the arrangement could be modified in many respects and still be within the scope of the present Linvention as limited only by the following appended claims.

What is claimed is:

1. A vehicle drum brake assembly comprising a support plate secured to a stationary portion of the vehicle adjacent a wheel axle, a brakedrum secured to the vehicle wheel and rotatable therewith, a pair of brakeshoe assemblies positioned within said drum, an automatic adjusting device positioned between and being operable to expand adjacent ends of said brakeshoes as brake lining wear occurs, said support plate containing a notch substantially diametrically opposite from said adjusting device, a wheel cylinder assembly loosely mounted in said notch and containing a piston movable by hydraulic pressure to expand said shoes into engagement with said brakedrum, and spaced double web members centrally on said brakeshoes receiving a substantial peripheral portion of said support plate whereby expansive and contractive movement of said shoes is guided upon said plate by said web members during application and release of the brakes.

2. A vehicle drum brake assembly comprising a support plate secured to the stationary portion of the vehicle adjacent a wheel axle; a brakedrum secured to the vehicle wheel rotatable upon the axle; a pair of double web brakeshoe assemblies positioned within said drum, said double webs being centrally positioned on the inward side of said shoe assemblies, the show assemblies being formed of stamped sheet metal whereby the double Lwebs and the brakeshoes comprise a segment of an arc slidably receiving a circumferential portion of the periphery of the support plate within a slot defined by the double webs; an automatic adjusting device located within said drum; said brakeshoe assemblies terminating in adjacent ends in engagement with and supporting said automatic adjusting device, said support plate containing a notch substantially diametrically opposite from said adjusting device; a brake apply wheel cylinder assembly including a tubular housing containing slots in each end thereof, said tubular housing slots loosely positioning the housing within said support plate notch, the loose fit providing a predetermined degree of rotational movement relative thereto; a pair of pistons within said tubular housing movable by pressure fluid in opposite directions from a central position therein, projections on said double web portions extending within said tubular housing into engagement with respective ends of said pistons whereby expansive movement of said pistons engages said brakeshoe assemblies with said brakedrum and said tubular housing cants into anchored engagement with said support plate while the vehicle brakes are being applied.

3. A vehicle drum brake assembly comprising a support plate secured to a stationary portion of the vehicle adjacent a wheel axle, a brakedrum secured to a vehicle wheel rotatable upon the axle, a pair of brakeshoe assemblies formed of stamped sheet metal positioned within said drum, an automatic adjusting device located within said drum, said adjusting device connected to adjacent ends of said brakeshoe assemblies and being operable to expand the brakeshoes toward said brakedrum as brake lining wear occurs, said support plate containing a notch substantially diametrically opposite from said adjusting device near the other adjacent ends of said brakeshoe assemblies, a tubular wheel cylinder containing slots in each end thereof and being loosely mounted in said supporting plate notch, said wheel cylinder assembly containing a pair of oppositely movable pistons, Lsaid pistons containing spaced recesses in the outward surfaces thereof, projections on said stamped brakeshoe assemblies extending into said wheel cylinder assembly and being received by said piston recesses for a limited arcuate movement therein, a flexible seal member secured in each end of said wheel cylinder assembly providing a seal between said brakeshoe projections and said wheel cylinder, and a U-shaped spring member having each leg thereof secured in a recess in each of said brakeshoe assemblies while the central portion of the spring engages the support plate securing the spring in place, said spring continually retracting the shoes in the absence of fluid pressure within said wheel cylinder, the supplying of pressure fluid to the central portion of said wheel cylinder moving said pistons outwardly therein to initially engage the brakeshoes with the brakedrum whereupon rotational movement of the brakedrum causes said wheel cylinder to be angularly moved in said support plate notch until the slot surfaces engage the support plate and anchor the brakeshoes in place.

4. A vehicle drum brake assembly comprising a support plate secured to the stationary portion of the vehicle adjacent a wheel axle, a brakedrum secured to the vehicle wheel rotatable upon the axle, a pair of double web brakeshoe assemblies positioned within said drum for selective engagement with the interior surface thereof, said double webs being centrally positioned on the inward side of said shoe assemblies which are formed of stamped sheet metal, said double webs defining a slot therebetween slidably receiving a peripheral portion of said support plate, the peripheral portion of said support plate guiding expansive and contractive movement of the brakeshoe assemblies, an automatic adjusting device positioned within said drum and engaging adjacent ends of said brakeshoe assemblies, said support plate containing a notch substantially diametrically opposite adjusting device, a wheel cylinder housing containing slots in each end thereof, said cylinder housing slots having a width and depth sufficient to extend adjacent the edges of said notch in said support plate whereby said cylinder housing is loosely fitted within the notch, the slots providing a predetermined limited degree of rotational and axial movement of said cylinder housing within said notch, a pair of pistons slidably movable within said cylinder housing, the ends of said brakeshoe assemblies remote from said automatic adjusting device respectively engaging a piston in said cylinder housing, said housing and said pistons cooperating to define a pressure fluid chamber therebetween whereby the supply of pressure fluid to said chamber expands said pistons within said housing engaging said brakeshoe assemblies with the interior surface of said drum, rotation of said drum slightly rotating said brakeshoe assemblies until said cylinder housing is canted into positive engagement with the edges of the notch in said supporting plate thereby positively anchoring the assemblies during application of the brakes.

* * * * *